(12) United States Patent
Bauer et al.

(10) Patent No.: US 10,843,871 B2
(45) Date of Patent: Nov. 24, 2020

(54) SIDE-BY-SIDE SLATS FOR A CHAIN CONVEYOR BELT AND CONVEYOR BELT SYSTEM COMPRISING SAME

(71) Applicant: PRINCE CASTLE LLC, Carol Stream, IL (US)

(72) Inventors: Richard Bauer, Palatine, IL (US); Dennis Malkowski, Yorkville, IL (US); Ulf Bauer, Wuppertal (DE); Karl R. Heinze, Chicago, IL (US); Sajid Safvi, Lombard, IL (US); Tomasz Tyrawa, Streamwood, IL (US)

(73) Assignee: PRINCE CASTLE LLC, Carol Stream, IL (US)

( * ) Notice: Subject to any disclaimer, the term of this patent is extended or adjusted under 35 U.S.C. 154(b) by 348 days.

(21) Appl. No.: 15/829,840

(22) Filed: Dec. 1, 2017

(65) Prior Publication Data
US 2019/0168968 A1    Jun. 6, 2019

(51) Int. Cl.
| | |
|---|---|
| *B65G 17/42* | (2006.01) |
| *A47J 37/08* | (2006.01) |
| *A47J 37/04* | (2006.01) |
| *B65G 17/06* | (2006.01) |
| *B65G 15/54* | (2006.01) |
| *B65G 17/08* | (2006.01) |
| *B65G 17/44* | (2006.01) |

(52) U.S. Cl.
CPC ............ *B65G 17/42* (2013.01); *A47J 37/045* (2013.01); *A47J 37/08* (2013.01); *A47J 37/0857* (2013.01); *B65G 15/54* (2013.01); *B65G 17/064* (2013.01); *B65G 17/065* (2013.01); *B65G 17/067* (2013.01); *B65G 17/083* (2013.01); *B65G 17/44* (2013.01)

(58) Field of Classification Search
CPC .... B65G 17/06; B65G 17/065; B65G 17/067; B65G 17/08; B65G 17/083; B65G 17/42; B65G 17/44; A47J 37/045; A47J 37/0857
See application file for complete search history.

(56) References Cited

U.S. PATENT DOCUMENTS

| | | |
|---|---|---|
| 2,987,167 A | 6/1961 | Franz |
| 4,394,901 A | 7/1983 | Roinestad |
| 4,473,365 A | 9/1984 | Lapeyre |
| 5,307,923 A | 5/1994 | Damkjaer |

(Continued)

FOREIGN PATENT DOCUMENTS

| | | | |
|---|---|---|---|
| JP | H06-141985 A | 5/1994 | |
| WO | WO-2016194103 A1 | * | 12/2016 |

OTHER PUBLICATIONS

Machine-assisted translation of JP-H06-141985-A.

*Primary Examiner* — Christopher M Koehler
(74) *Attorney, Agent, or Firm* — Andrus Intellectual Property Law, LLP

(57) ABSTRACT

A conveyor belt system provides a continuous flat support surface for a food item that moves the food item through a food preparation device. The conveyor belt system includes a conveyor belt having a plurality of spaced apart rods and a plurality of slats that are removably attached to the conveyor belt with a rod connection mechanism. The slats also include a lateral connection mechanism for lateral removable attachment to an adjacent slat. The slats are easily assembled and provide enhanced field service and/or replacement capability.

27 Claims, 13 Drawing Sheets

(56) References Cited

U.S. PATENT DOCUMENTS

| | | |
|---|---|---|
| 6,223,889 B1 | 5/2001 | Layne et al. |
| 6,581,758 B1 | 6/2003 | Van-Zijderveld et al. |
| 6,707,014 B1 * | 3/2004 | Corey ............... A23L 3/185 198/844.1 |
| 6,918,486 B2 | 7/2005 | Shibayama et al. |
| 7,278,535 B2 | 10/2007 | Damkjaer |
| 7,314,132 B2 | 1/2008 | Layne et al. |
| 7,419,051 B2 | 9/2008 | Damkjaer |
| 7,530,455 B2 | 5/2009 | Lucchi |
| 7,708,135 B2 | 5/2010 | Ellerth et al. |
| 7,721,877 B2 | 5/2010 | Maine, Jr. et al. |
| 7,800,023 B2 | 9/2010 | Burtea et al. |
| 7,878,323 B2 | 2/2011 | Van Rees et al. |
| 7,975,840 B2 | 7/2011 | Messick, Jr. et al. |
| 7,987,972 B2 * | 8/2011 | Hennigar ............ B65G 17/067 198/848 |
| 8,113,340 B1 | 2/2012 | Smith et al. |
| 8,499,928 B1 | 8/2013 | Liao et al. |
| 8,506,687 B2 | 8/2013 | Jones |
| 8,752,698 B2 | 6/2014 | Lasecki et al. |
| 8,863,944 B2 | 10/2014 | MacLachlan |
| 8,939,279 B2 | 1/2015 | Porter et al. |
| 9,073,694 B2 | 7/2015 | Ozaki |
| 9,221,611 B2 | 12/2015 | Ulchak et al. |
| 2010/0275789 A1 | 11/2010 | Lee et al. |
| 2015/0129395 A1 | 5/2015 | Messick, Jr. |
| 2015/0151919 A1 | 6/2015 | Messick, Jr. et al. |
| 2015/0191312 A1 | 7/2015 | Ulchak et al. |
| 2016/0185529 A1 | 6/2016 | Bauer |
| 2016/0185530 A1 * | 6/2016 | Malkowski ............ B65G 17/42 219/388 |

\* cited by examiner

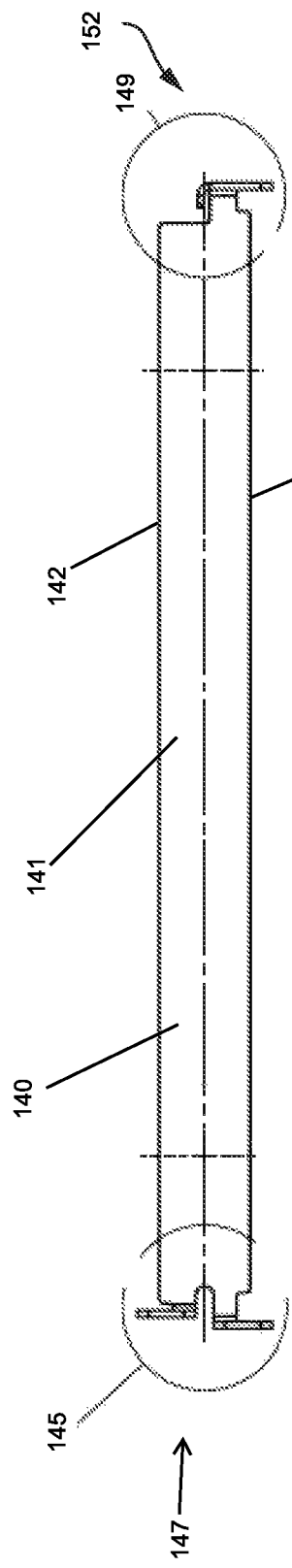
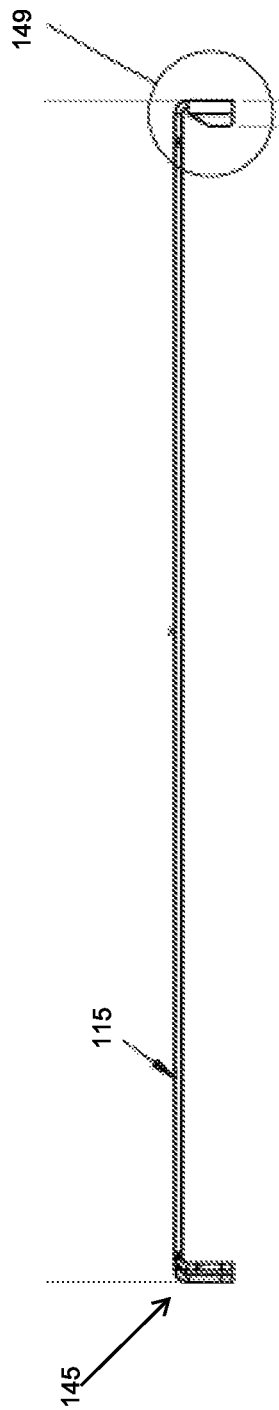
FIG. 3A
FIG. 3B

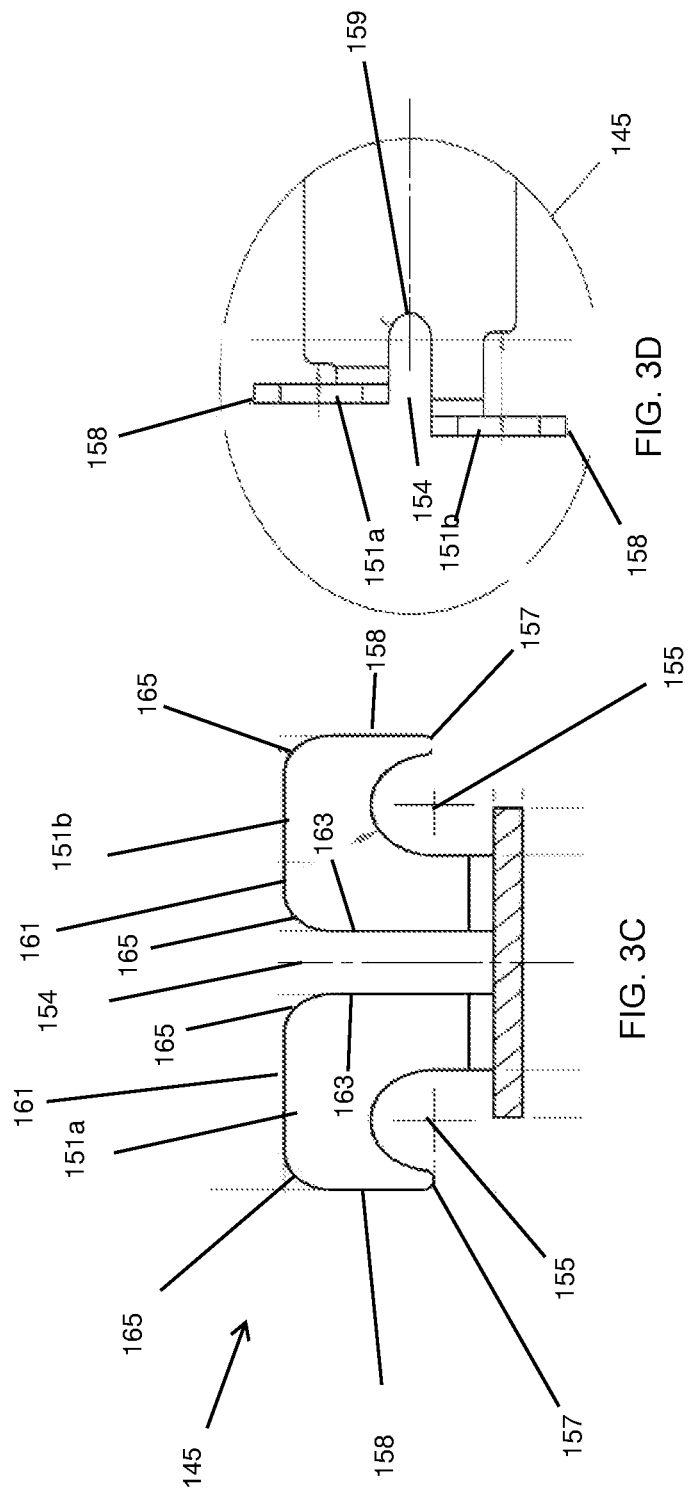

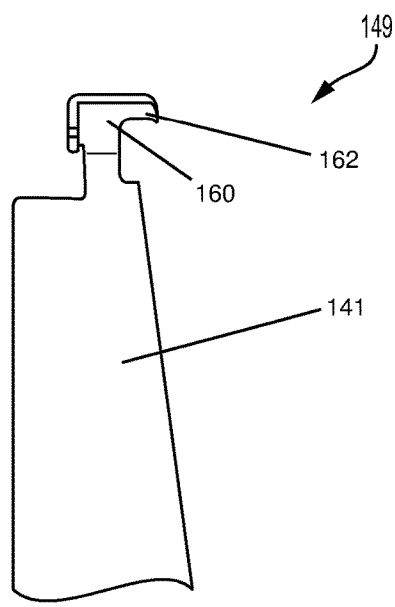
FIG. 3E
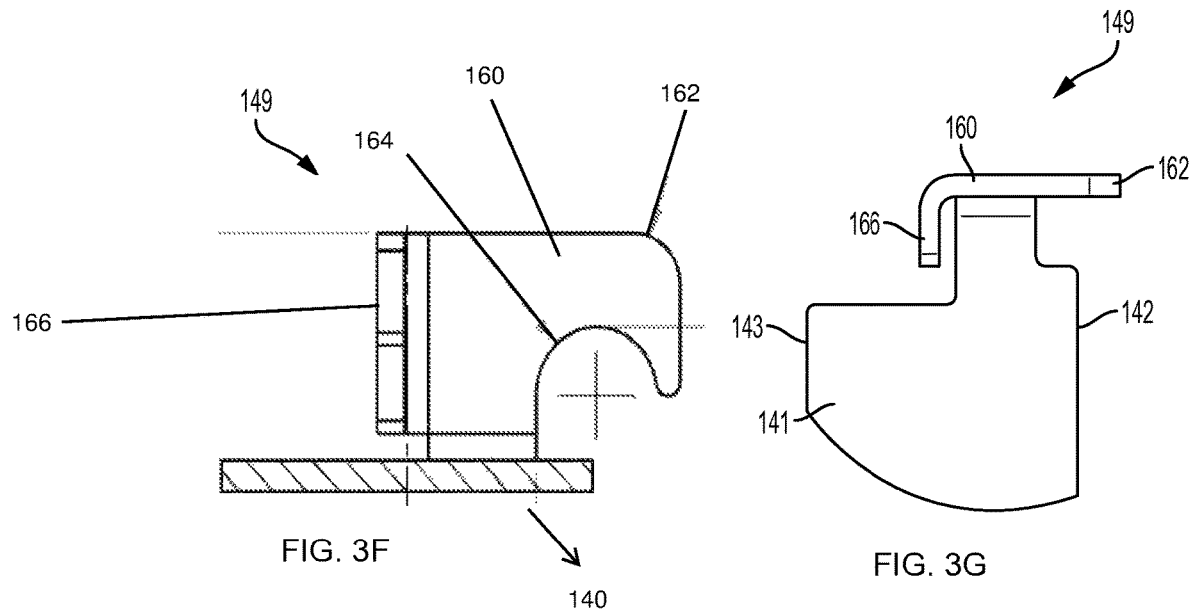
FIG. 3F
FIG. 3G

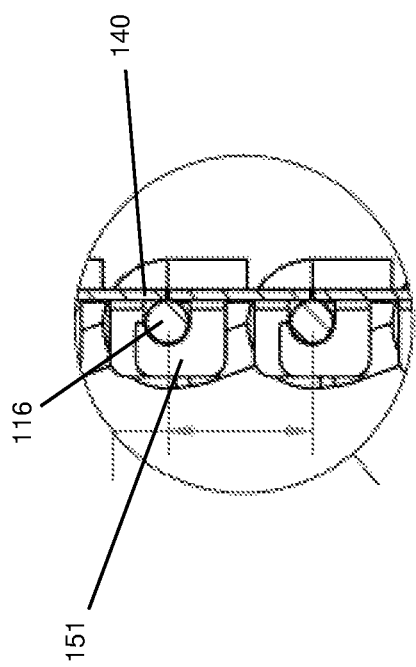
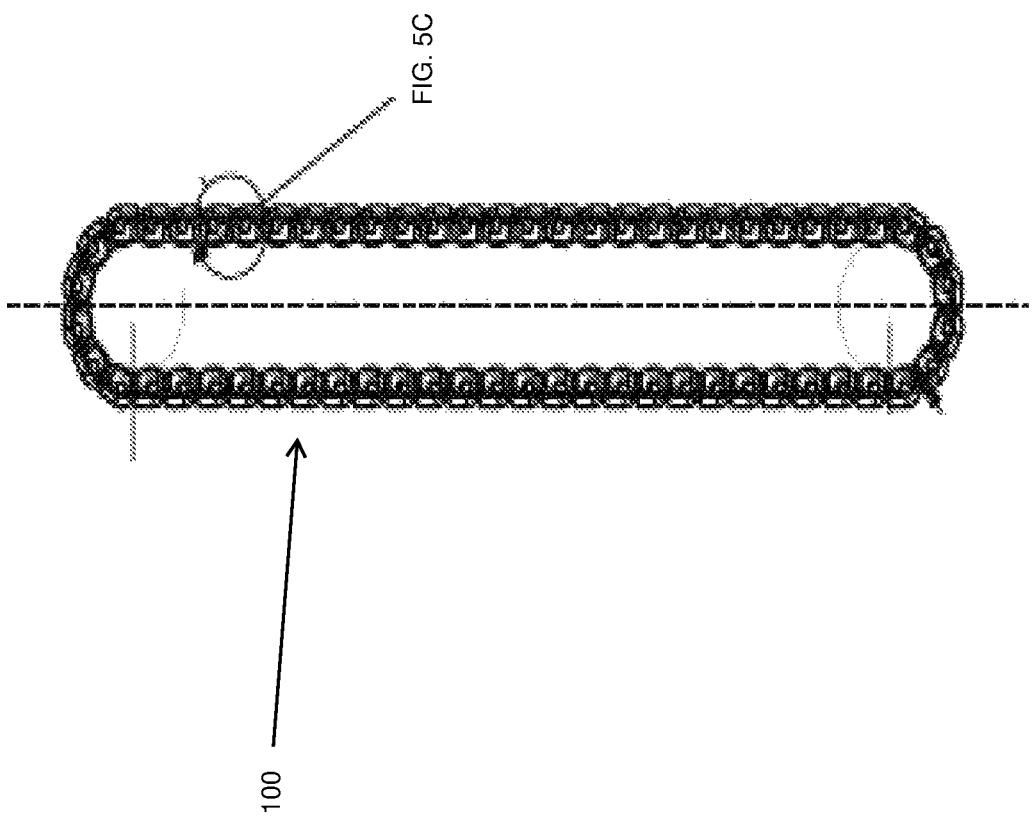

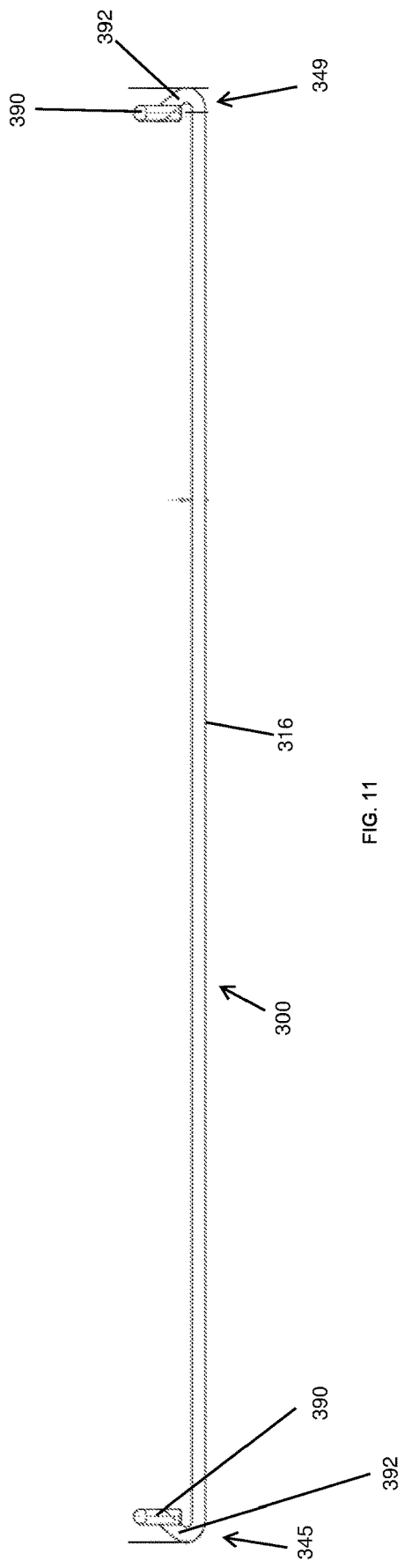

SIDE-BY-SIDE SLATS FOR A CHAIN CONVEYOR BELT AND CONVEYOR BELT SYSTEM COMPRISING SAME

FIELD OF THE INVENTION

The disclosure is directed to a conveyor belt for conveying food items into a heated food preparation chamber, such as a toaster. In particular, the disclosure is directed to side-by-side snap on slats for a conveyor belt that minimizes costs, simplifies field maintenance, and simplifies manufacturing and assembly of a conveyor belt including the snap on slats.

BACKGROUND

In the food preparation industry often food items are prepared, at least partially, by placing the food items on a conveyor belt that transports the food items into a food preparation device, such as a toaster or oven. Such toasters and ovens may include a heating device, such as a heated platen, and a slowly rotating conveyor belt. The conveyor belt holds the food item in close proximity to the platen while the conveyor belt simultaneously transports the food item through the preparation device. The length of time the food item is exposed to the heated platen may vary based on the length of the platen and the speed of the conveyor belt. Such toasters may process food items continuously as opposed to household toasters that process food items in batch mode, such as two or four pieces of bread at a time. Conveyor toasters are ill-suited for consumer use because of their size, manufacturing cost, power requirements, and the time required to pre-heat the platen to operating temperature. However, conveyor toasters are preferred by restaurants and food services that require high-volume through-put and consistent heating/toasting.

Conveyor toasters generally include a wire conveyor belt. Wire conveyor belts are ideal for material handling, cooking, icing, slicing, breading, cooling, filling, inspecting, and packing of products like breads, rolls, buns, donuts, confections, cakes, pies, pastries, meat, seafood, poultry, and other processed foods. The simple, open design of wire conveyor belts provides efficient operation with minimum maintenance and easy cleanup to meet sanitation requirements. One such known wire conveyor belt is illustrated in FIGS. 1 and 2. The wire conveyor belt 10 may include a plurality of spaced metal rods 16 interconnected by coupling "hook" and "loop" connection elements 18, 20 formed at the rod ends of adjacent metal rods 16. The rods 16 may support a food item and the rods 16 may hold the components of the belt together by way of the interconnected hook and loop connection elements 18, 20. Other types of wire conveyor belts may include spaced adjacent metal rods as well. For example, a roller chain conveyor includes spaced metal rods similar to those illustrated in FIGS. 1 and 2.

One known conveyor belt, for example, is the wire conveyor belt disclosed in U.S. Pat. No. 7,987,972, which is herein incorporated by reference in its entirety. The wire conveyor belt provides a flat support surface, but is relatively expensive to produce and is cumbersome to assemble and relatively difficult to repair or replace in the field. The plates are attached to a first spaced rod at a first end and to a second spaced rod that is adjacent to the first spaced rod at the second end.

SUMMARY

According to some aspects, a conveyor belt assembly for a food preparation device includes a conveyor belt, the conveyor belt having a plurality of spaced rods and a plurality of slats. At least one of the slats in the plurality of slats includes a flat body portion having a top surface and a bottom surface. The at least one slat is removably attached to the conveyor belt with a rod connection mechanism. The rod connection mechanism is located at a first end of the at least one slat. The at least one slat is removably attached to an adjacent slat with a slat connection element, which is located at a second end of the at least one slat.

According to another aspect, a food preparation device includes a housing, a heating element located within the housing, and a conveyor belt assembly. The conveyor belt assembly includes a conveyor belt having a plurality of spaced rods and a plurality of slats. At least one of the slats in the plurality of slats includes a flat body portion having a top surface and a bottom surface. The at least one slat is removably attached to the conveyor belt with a rod connection mechanism. The rod connection mechanism is located at a first end of the at least one slat. The at least one slat is removably attached to an adjacent slat with a slat connection element, which is located at a second end of the at least one slat.

According to yet another aspect, a slat for a conveyor belt assembly includes a flat body portion, a rod connection mechanism disposed at a first end of the flat body portion and a slat connection element disposed at a second end of the flat body portion. The rod connection mechanism includes two hooks that extend away from a bottom surface of the flat body portion. The hooks legs are separated by a gap. The slat connection element includes a plate that extends downward, away from the flat body portion and substantially perpendicular to the flat body portion.

According to yet another aspect, a master slat for a conveyor belt assembly includes a flat body portion, a rod connection mechanism disposed at a first end of the flat body portion and a snap-on connection element disposed at a second end of the flat body portion. The rod connection mechanism includes two hooks that extend away from a bottom surface of the flat body portion. The hooks legs are separated by a first gap. The snap-on connection element includes two legs that extend away from the bottom surface of the flat body portion, the two legs being separated from one another by a second gap.

In accordance with the teachings of the disclosure, any one or more of the foregoing aspects of a conveyor belt assembly may further include any one or more of the following optional forms.

In some optional forms, the rod connection mechanism comprises two hooks that extend away from the bottom surface of the flat body portion, the two hooks being separated from one another by a gap.

In other optional forms, the gap includes a radiused top.

In yet other optional forms, the hooks include a radiused cradle sized and shaped to receive a portion of a rod.

In yet other optional forms, the tine connects the radiused cradle to an outer lateral surface.

In yet other optional forms, the hook includes a bottom surface that opposes the radiused cradle and is connected to the outer lateral surface and an inner lateral surface by a radiused edge.

In yet other optional forms, the radiused cradle includes a surface that forms an arc of a circle.

In yet other optional forms, the slat connection element includes a plate that extends downward, away from the flat body portion and substantially perpendicular to the flat body portion.

In yet other optional forms, the slat connection element includes a hook that extends forward from the plate.

In yet other optional forms, the hook includes a radiused surface that is sized and shaped to seat a portion of a rod in the plurality of spaced apart rods.

In yet other optional forms, the slat connection element includes a stabilizing wall that extends from the plate aft, towards a trailing edge of the flat base portion.

In yet other optional forms, the stabilizing wall is substantially perpendicular to the plate and that extends towards a side surface of the flat base portion.

BRIEF DESCRIPTION OF THE DRAWINGS

FIG. 3A is a bottom view of one embodiment of a side-by-side slat for use on a wire conveyor belt system.

FIG. 3B is a side elevational view of the side-by-side slat of FIG. 3A.

FIG. 3C is a side elevational view of a first end of the side-by-side slat of FIG. 3A.

FIG. 3D is a bottom view of the first end of FIG. 3C.

FIG. 3E is a perspective view of a second end of the side-by-side slat of FIG. 3A.

FIG. 3F is a side elevational view of the second end of FIG. 3E.

FIG. 3G is a bottom view of the second end of FIG. 3E.

FIG. 5B is a side view of the conveyor belt of FIG. 5A.

FIG. 5C is a close up side view of a portion of the conveyor belt of FIG. 5B.

FIG. 11 is a perspective view of a master link for a wire conveyor belt.

DETAILED DESCRIPTION

Figure 1:
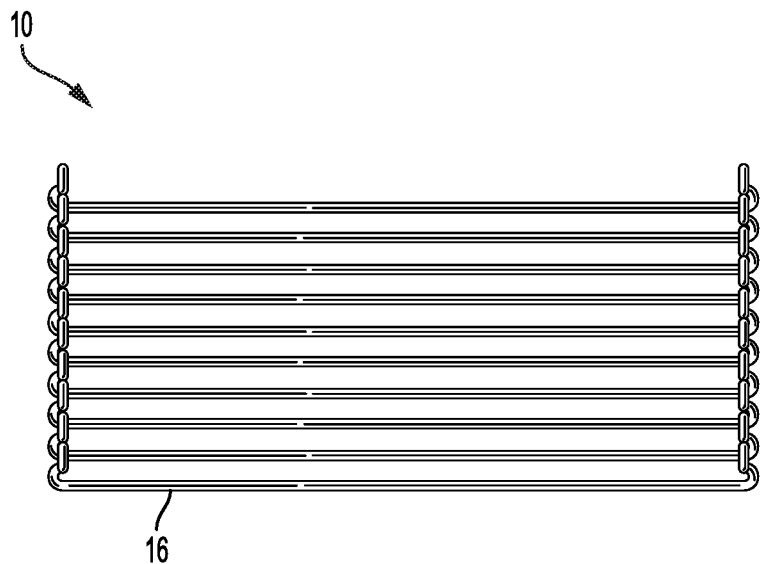
FIG. 1 is a top view of a segment of a conventional wire conveyor belt.

A conveyor belt system with a plurality of side-by-side slats supports a food product and moves the food product through a food preparation device, such as a toaster or oven, without substantially marking or pinching the food product. Additionally, the conveyor belt system with side-by-side slats eases assembly of the conveyor belt system while also providing the ability to replace or repair individual slats in the field without the need for specialized tools. Individual slats may be made of any material that is durable enough to withstand temperatures within the food preparation device. Examples of slat materials include metals, such as copper, iron, aluminum, and nickel, and/or metal alloys such as steel, brass, and bronze. Stainless steel is one preferred material for manufacturing the slats and AISI T-304 is an exemplary type of stainless steel that may be preferred.

Turning now to FIGS. 3A-3G, each slat 140 includes a flat base portion 141 having a leading edge 142 and a trailing edge 143 relative to the direction of conveyance. Each slat 140 also includes a rod connection element 145 at a first end 147 of the flat base portion 141 and a slat connection element 149 at a second end 152 of the flat base portion 141. The rod connection element 145 extends substantially perpendicular to the flat base portion 141 and away from a top surface 115. The rod connection element 145 removably secures the slat 140 to a conveyor belt by sliding between two adjacent rods so that the slat 140 may be separated from the conveyor belt when desired. The rod connection element 145 leaves the leading edge 142 and the trailing edge 143 free of any attachment either with adjacent slats 140 or with the rods 116, so that adjacent slats 140 may partially rotate relative to one another, for example when rotating around a sprocket.

The rod connection element 145 may include two spaced apart hooks 151 that are separated from one another by a gap 154. Each hook 151 may include a radiused cradle 155 that is sized and shaped to receive and releasably connect to a metal rod in a wire conveyor. For example, the cradle 155 may include a curved surface that forms an arc of a circle, to complement the outer surfaces of cylindrical metal rods. The gap 154 allows the hooks 151 to be displaced towards one another when the slat 140 is being secured to the conveyor belt. The gap 154 may include a radiused top 159 that disperses material stress, especially when the two hooks 151 are displaced towards one another during installation of the removable slat 140 on a metal rod conveyor.

A tine 157 forms a junction between the cradle 155 and an outer lateral surface 158. A bottom surface 161 opposes the cradle 155 and is connected to the outer lateral surface 158 and to an inner lateral surface 163 by a radiused edge 165.

In the embodiment illustrated in FIGS. 3A-3G, a first hook 151a is offset in a lateral direction (i.e., a width direction of the slat 140) from a second hook 151b. Offsetting the hooks 151a, 151b in the width direction from one another can advantageously enhance clearance between hooks 151a, 151b on adjacent slats 140, thereby preventing interference between adjacent hooks 151a, 151b. In other embodiments, the hooks 151a, 151b may be aligned with one another.

The slat connection element 149 includes a plate 160 that extends downward, generally perpendicular to the flat base portion 141 and away from the flat base portion 141 from a side edge of the flat base portion 141. A hook 162 extends forward from the plate 160, towards the leading edge 142 of the flat base portion 141. The hook 162 includes a radiused cradle 164 proximate the flat base portion 141. The radiused cradle 155 may be sized and shaped to seat a rod of the conveyor belt when the slat 140 is attached to the conveyor belt. A stabilizing wall 166 extends from the plate 160 aft, towards the trailing edge 143 of the flat base portion 141. The stabilizing wall 166 is substantially perpendicular to the plate 160 and extends towards a side surface of the flat base portion 141. The stabilizing wall 166 abuts against a stabilizing wall 166 of an adjacent slat 140 when two slats 140 are connected to one another.

Figure 4:
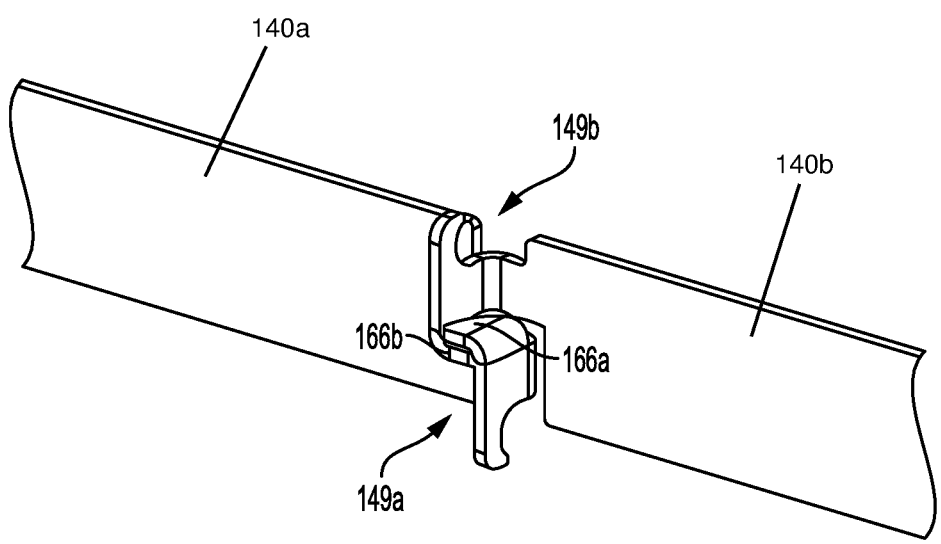
FIG. 4 is a perspective view of connected ends of two side-by-side slats connected to one another.

Turning now to FIG. 4, two side-by-side slats 140a, 140b are connected with one another by respective slat connection elements 149a, 149b. The stabilizing walls 166a, 166b abut against one another to interlock and stabilize the side-by-side slats 140a, 140b.

Figure 2:
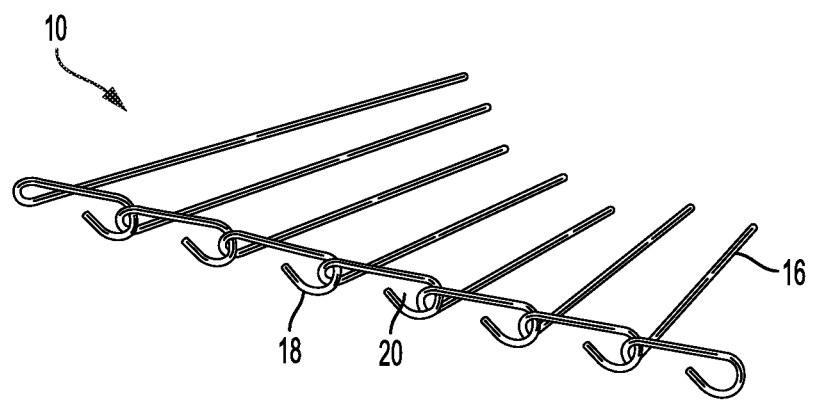
FIG. 2 is a side perspective view of the wire conveyor belt segment shown in FIG. 1.
Figure 5A:
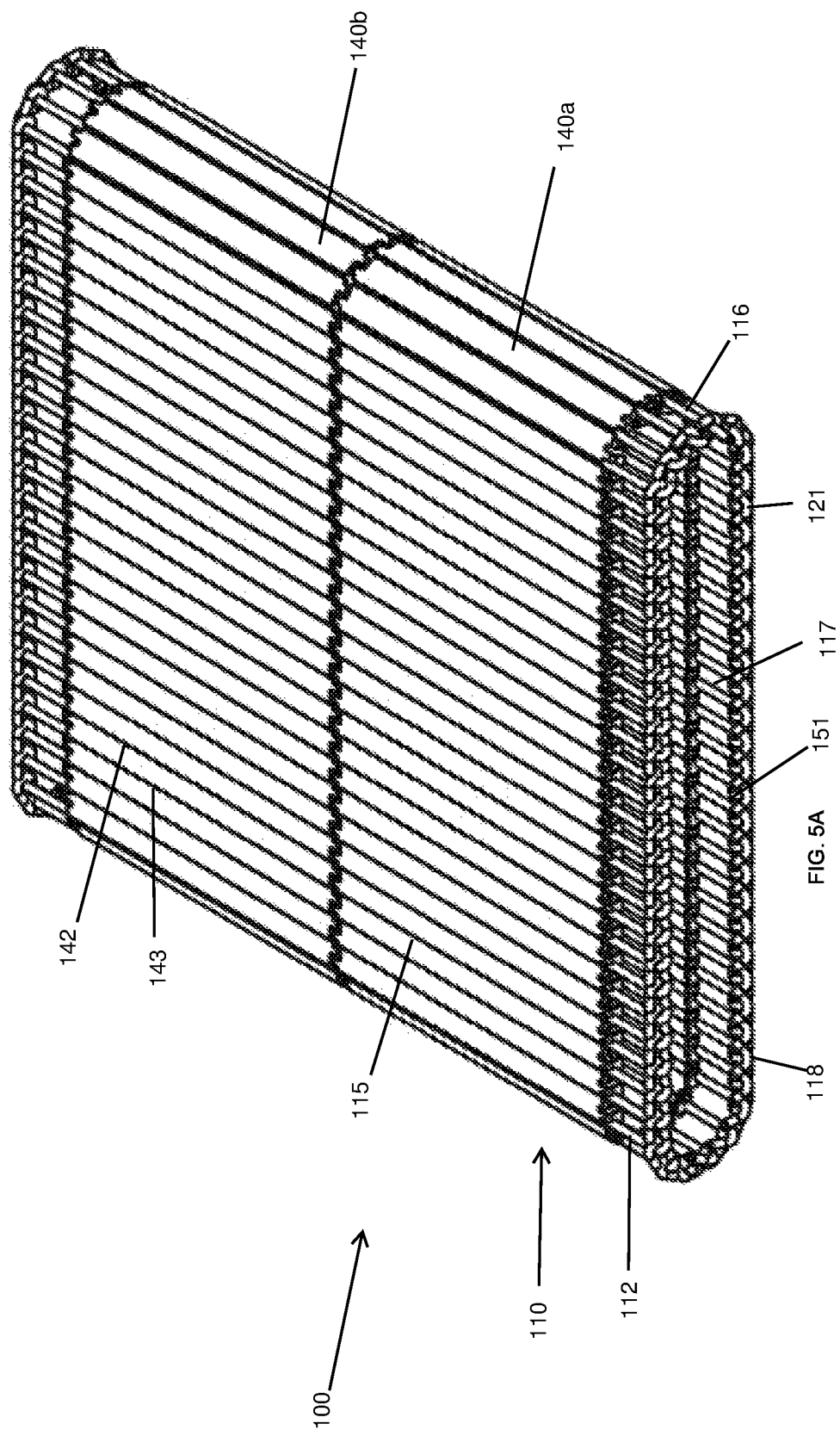
FIG. 5A is a perspective view of a conveyor belt system constructed in accordance with the disclosure, the system includes a conveyor belt and a plurality of side-by-side slats removably coupled to the conveyor belt.

Turning now to FIGS. 5A-5C, a conveyor belt system 100 includes a wire conveyor belt assembly 110, which includes a drive mechanism, such as a drive sprocket (not shown). The wire conveyor belt assembly 110 includes a wire conveyor belt 112 and a plurality of side-by-side removable slats 140. The wire conveyor belt 112 may take the form illustrated in FIGS. 1 and 2, having hook and loop connection elements, or the wire conveyor belt 112 may have any other known form that includes spaced metal rods (e.g., a roller chain conveyor belt). The plurality of slats 140 form a continuous flat support surface for conveying an item, particularly a food item through a food preparation device, such as a toaster or oven.

The conveyor belt 112 comprises a plurality of spaced metal rods 116 disposed in succession and transversely with respect to a direction of conveyance. The plurality of spaced rods 116 form the wire conveyor belt 112 which serves, in part, as a scaffolding for the plurality of removable slats 140. The wire conveyor belt 112 also interacts with the drive mechanism, to move the rods 116 and the removable slats 140 through the food preparation device. Other scaffoldings capable of receiving removable slats 140 may also be used. In the embodiment illustrated in FIG. 5A, each rod 116 has two end portions 121 and a supporting rod portion 116 extending therebetween. Each end portion 121 includes a terminal hook connection element 118 that protrudes in a first direction, curves, and extends in a direction substantially opposite to the first direction for a predetermined distance. Each rod 116 also has two loop connection elements, which are formed in the rods 116 themselves. The hook connection elements 118 are interconnected/coupled to the loop connection elements of an adjacent spaced metal rod 116 to interlock adjacent metal rods 116. The hook connection elements 118 and the loop connection elements interact to allow adjacent rods 116 to pivot about an axis of the rod 116, for example while turning around the sprocket, while securing adjacent rods 116 to one another.

The conveyor belt assembly 110 includes the plurality of spaced metal rods 116 and the plurality of substantially flat slats 140. The slats 140 form a top side or support side 115 and a bottom side 117. The top side 115 forms a flat support surface for conveying the food product, and the bottom side 117 forms a platform that is at least partially supported by the rods 116. In some embodiments, the slats 140 may be welded to one another in a single row after installation.

The support surface 115 is formed by the plurality of slats 140 which are coupled to selected rods 116 of the plurality of spaced metal rods 116. The slats 140 are secured at least partially between a first spaced rod 116 of the plurality of spaced rods 116 and a second spaced rod 116, the second spaced rod 116 being separated from the first spaced rod and supporting the slat 140 so that a leading edge 142 and a trailing edge 143 are unsecured and free of any attachment, but supported along the bottom 117, thereby providing a joint that allows adjacent slats 140 to partially rotate relative to one another at the leading edge of each slat 140 and at the trailing edge of each slat 140, for example, when the slats 140 turn around the sprocket.

As illustrated in FIGS. 5A-5C, when the slat 140 is secured to the conveyor belt 112, the hooks 151 extend between adjacent rods 116. One rod 116 being seated within the cradle 155 of a first leg 151 (e.g., a front leg) and another rod 116 being seated within the cradle 155 of a second leg 151 (e.g., a back leg). The tine 157 (FIG. 3E) prevents the hooks 151 from backing out of the gap between the rods 116. To remove the slat 140, the slat 140 may be twisted in a direction generally parallel to the direction of travel, which will cause the hooks 151 to release from the rods 116, due to the curved surface of the notch 155 leading up to the tine 157. As the rotation increases, the tine 157 will eventually move far enough away from the rod 116 so that the hooks 151 will be able to pass between adjacent rods 116, thereby allowing the slat 140 to be removed from the conveyor belt 112.

Conversely, to secure the removable slat 140 to the conveyor belt 112, the slat 140 is turned in a parallel direction to the direction of travel and the hooks 151 are placed into a gap between two rods 116. The slat 140 may then be turned perpendicular to the direction of travel, which causes the hooks 151 to capture the rods 116. Once the slat is perpendicular to the direction of travel, the rods 116 seat within the cradles 155. The same rod 116 may also seat within a cradle 155 of an adjacent slat 140.

In the embodiment of FIGS. 5A-5C, the plurality of slats 140 includes two side-by-side slats 140 in each row of slats. A single row of slats 140 is illustrated in FIG. 5A by the first slat 140a and the second flat slat 140b, which are oriented side-by-side and illustrated apart from the conveyor belt 112. In other embodiments, each row of slats may include more than two side-by-side slats 140. For example, each row of slats may include 3, 4, 5, 6, or more side-by-side slats in a width direction of the conveyor belt 112. If more than two slats 140 are included in a row of slats, intermediate slats (i.e., the slats that are located between the two lateral outermost slats) may include slat connection elements 149 at each end thereof. The two lateral outermost slats include connection elements 145 at one end and slat connection elements 149 at another end, as illustrated in FIGS. 3A-3G.

The removable slats 140 are preferably formed from a metal material, such as stainless steel, or any other suitable material. For example, the removable slats 140 may be manufactured from an extrudable material including, but not limited to, extrudable metals, extrudable polymers, and extrudable ceramics. Exemplary extrudable metals include, but are not limited to, aluminum, brass, copper, magnesium, and steel. Aluminum alloys such as hard coated anodized aluminum, for example AA 6063-T6, are preferred. Exemplary extrudable plastics include, but are not limited to, polyvinylchlorides, polyethylenes, polypropylenes, acetals, acrylics, nylons (polyamides), polystyrene, acrylonitrile butadiene styrenes, and polycarbonates.

In the conveyor belt system 100 of FIGS. 5A-5C, the top surfaces 115 of the removable slats 140 are generally smooth. The top surfaces may, however, be corrugated or textured to better grip an item. In other embodiments, the top surfaces of the removable slats 140 may include gripping features to retain an item while the item is transported to facilitate the frictional engagement of the food product. The roughness of the surface of the removable slats 140 in one embodiment may be provided by shot peening the surfaces of the slats 140 using a predetermined shot size, as is disclosed in U.S. Patent Publication No. 2010/0275789, which is herein incorporated by reference in its entirety. Alternatively, the surface of the removable slat 140 may have gripping features such as an abrasive coating, dimples, furrows, or protrusions that would be strong enough to grip the food product, but not so abrasive that the gripping features rip, tear, or mark the food product.

Figure 6:
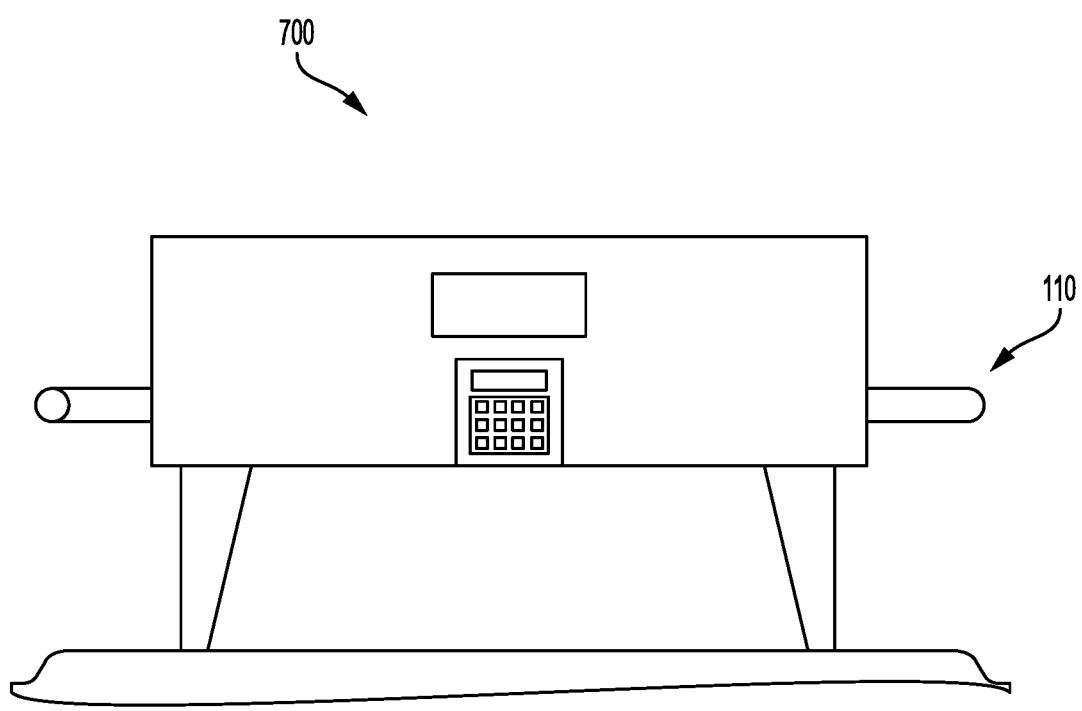
FIG. 6 is a front view of a horizontal toaster including the conveyor belt system of FIG. 5.
Figure 7:
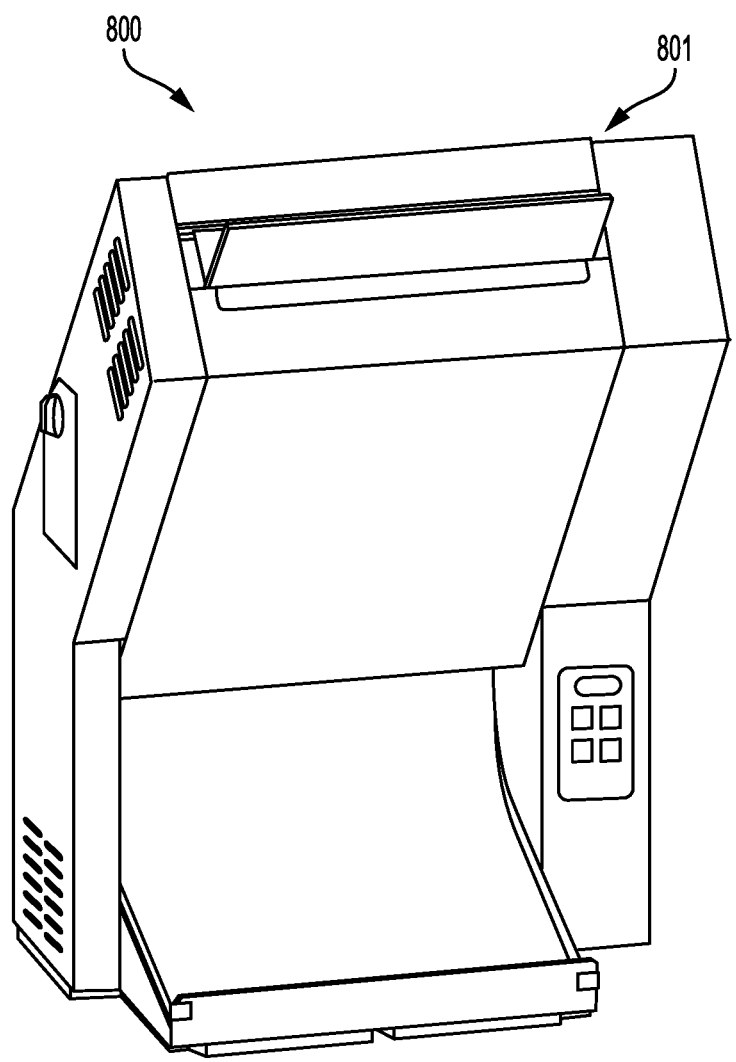
FIG. 7 is a perspective view of a vertical toaster having an angled product feed chute and including the conveyor belt system of FIG. 5.
Figure 8:
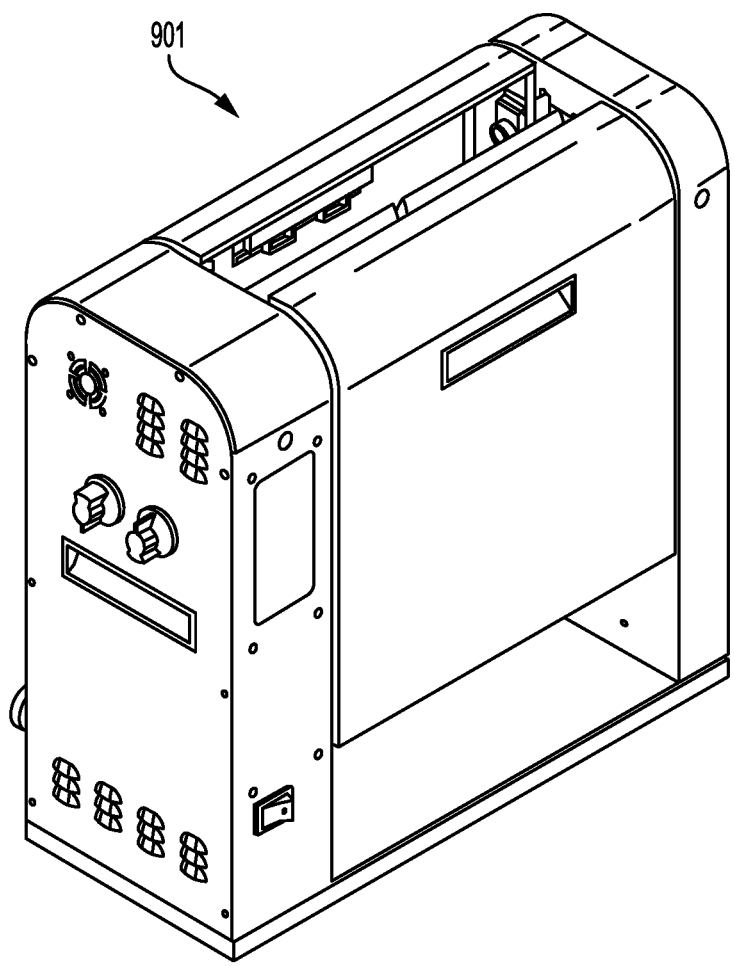
FIG. 8 is a perspective view of a vertical toaster having a vertical product feed chute and including the conveyor belt system of FIG. 5.

The conveyor belt system 100 may be used in a horizontal toaster 700 as illustrated in FIG. 6, an angled toaster 800 as illustrated in FIG. 7, or a vertical toaster 901 as illustrated in FIG. 8.

Existing conveyor toasters usually include a product feed where the product is inserted into an opening of the toaster. For example, in the angled toaster 800 in FIG. 7, the product travels down an angled shoot 801, usually angled at about 45 degrees, and is received by a conveyor belt 110 (not shown in FIG. 7). The conveyor belt assembly 110 receives the food product and urges it through an opening between the conveyor belt and a heated platen. In some conveyor toasters, the food product is compressed through this opening between the platen and the conveyor belt, also called a compressive gap, to process the food product.

Figure 9:
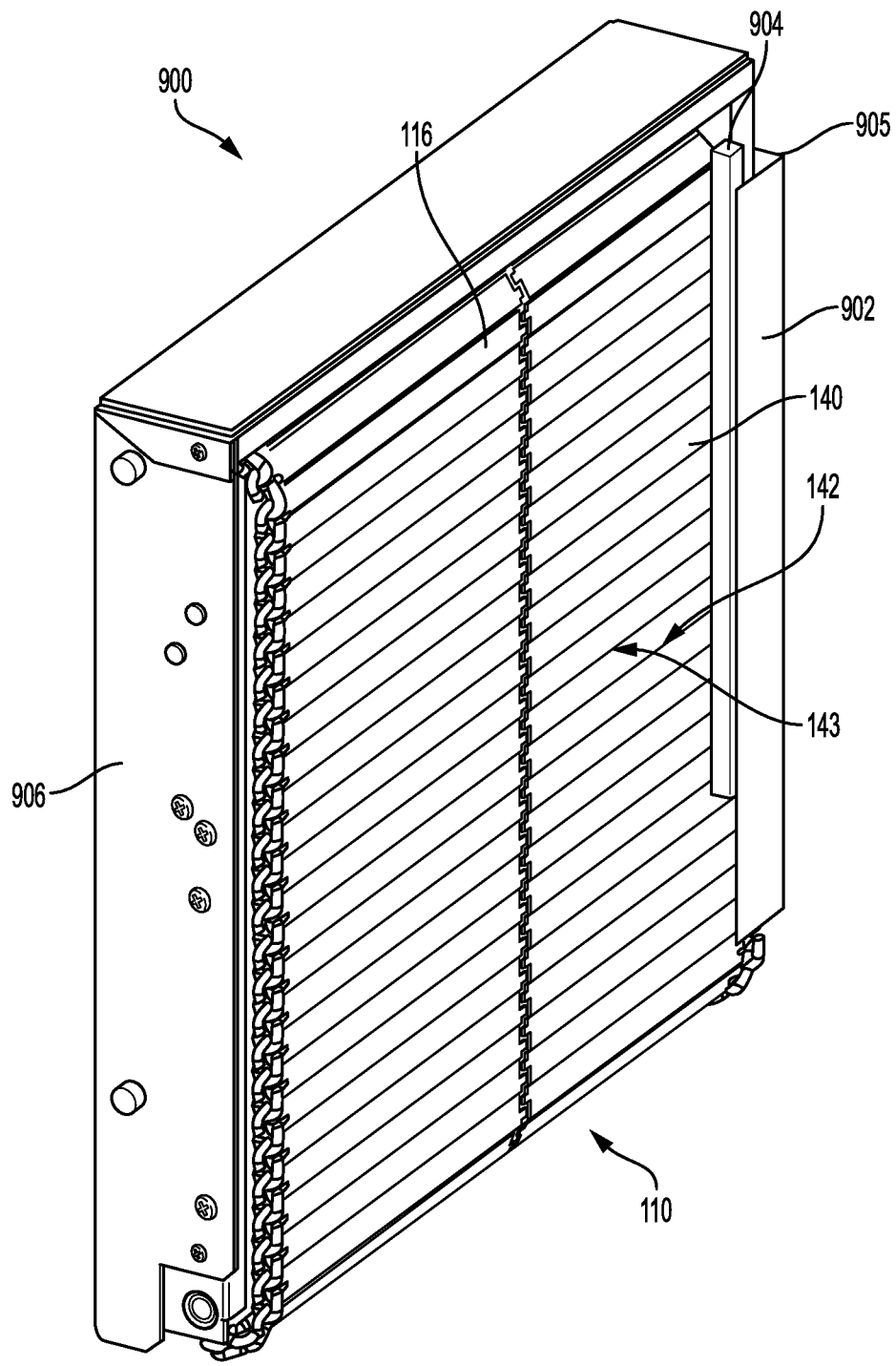
FIG. 9 is a perspective view of the vertical toaster of FIG. 8 with a cover removed revealing the conveyor belt system of FIG. 5.
Figure 10A:
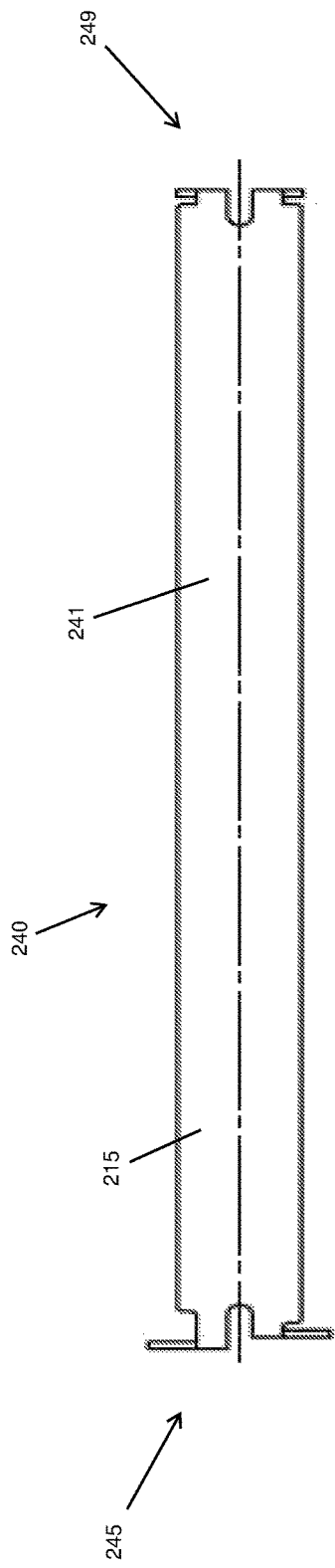
FIG. 10A is a top plan view of an alternate embodiment of a master side-by-side slat.
Figure 10B:
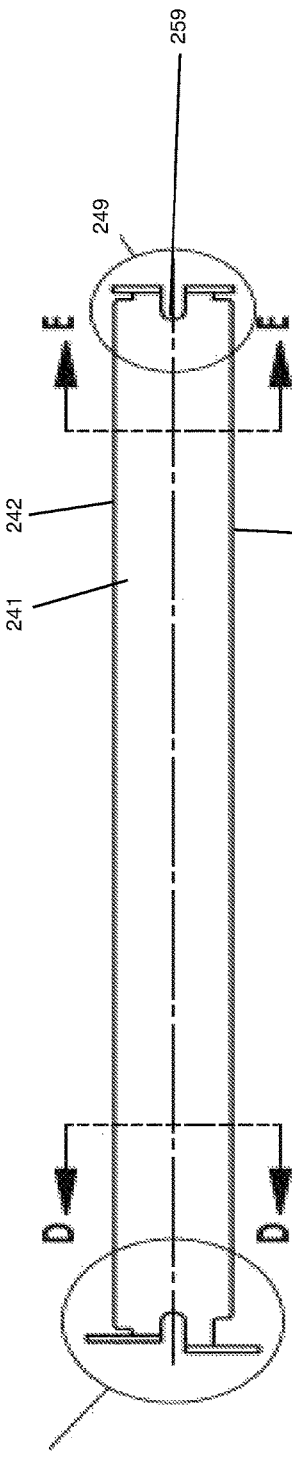
FIG. 10B is a bottom view of the side-by-side slat of FIG. 10A.
Figure 10C:
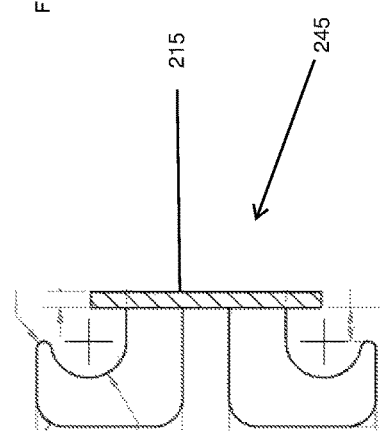
FIG. 10C is a side elevational view of one end of the side-by-side slat of FIG. 10A.
Figure 10D:
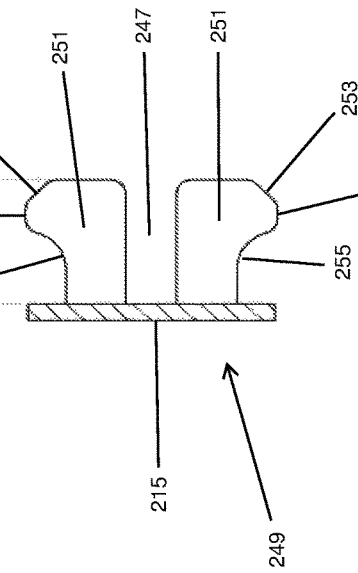
FIG. 10D is a side elevational view of another end of the side-by-side slat of FIG. 10A.

The disclosed conveyor belt system 100 may be used in a vertical toaster 901, as illustrated in FIG. 8. The vertical toaster 901, an example of which is disclosed in U.S. Patent Publication No. 2010/02757789, has multiple removable and adjustable conveyor belts that receive a food product at an opening at the top of the toaster. As illustrated in FIG. 9, a vertical conveyor belt system 900 may include a guide structure 902 that runs the full length of the conveyor belt 112. In one embodiment, the conveyor belt system 900 may include a guide structure 902 on both ends of the conveyor belt assembly 110. The guide bar 904 may be fixed to a bracket 905 that attaches the guide bar 904 to the conveyor belt housing 906. The vertical toaster 901 includes a heating element (not shown), such as a heated platen, for example.

In accordance with a preferred embodiment of the conveyor belt system, the compression gap can be adjusted according to varying sizes of food product. In one embodiment, the conveyor belt can be adjusted with respect to the reactive surface as illustrated and explained in U.S. Patent Publication No. 2010/0275789.

Turning now to FIGS. 10A-10D, an alternative slat 240 is illustrated. The slat 240 includes a rod connection element 245 at one end and a intermediate rod connection or snap-on connection element 249 at another end. The rod connection element 245 is structured as the rod connection elements 145 described above with respect to FIGS. 1-9. Thus, in the interest of brevity, the rod connection element 245 will not be discussed further.

The snap-on rod connection element 249 extends substantially perpendicular to a flat base portion 241 and away from the top surface 215. The snap-on rod connection element 249 removably secures the slat 240 to the conveyor belt by sliding between two adjacent rods and expanding after passing the rods so that the slat 240 may be separated from the conveyor belt by applying a force in a direction opposite the snap-on rod connection element 249, for example, by pulling the slat 240 away from the conveyor belt. The snap-on rod connection element 249 leaves the leading edge 242 and the trailing edge 243 free of any attachment either with adjacent slats 240 or with the rods, so that adjacent slats 240 may partially rotate relative to one another, for example when rotating around the sprocket.

The snap-on rod connection element 249 may include two spaced apart legs 251 that are separated from one another by a gap 247. Each leg 251 may include an angled leading surface 253 and a notch 255. The angled leading surface 253 divides the leg 251 into a narrower portion distal to the flat base portion 241 and wider portion proximate to the flat base portion 241. A peak 257 may be formed between the angled leading surface 253 and the notch 255, the peak 257 defining the widest location of the leg 251. The notch 255 may be sized and shaped to receive one rod between the peak 257 and the flat base portion 241. For example, the notch 255 may include a curved surface that forms an arc of a circle, to complement the outer surfaces of the cylindrical rods. The gap 247 allows the legs 251 to be displaced towards one another when the slat 240 is being secured to the conveyor belt. The gap 247 may include a radiused top 259 that disperses material stress, especially when the two legs 251 are displaced towards one another during installation of the removable slat 240.

When the slat 240 is secured to the conveyor belt, the legs 251 extend between adjacent rods. One rod is seated within the notch 255 of a first leg 251 (e.g., a front leg) and another rod is seated within the notch 255 of a second leg 251 (e.g., a back leg). The peak 257 prevents the legs 251 from backing out of the gap between the rods. To remove the slat 240, a force may be applied in a direction away from the rods, which will cause the legs 251 to deform inwardly, towards one another, due to the curved surface of the notch 255 leading up to the peak 257. As the force increases, the peak 257 will eventually move far enough towards the other leg 251 that the peak 257 will be able to pass by the rod, thereby allowing the slat 240 to be removed from the conveyor belt. Alternatively, a force may be applied directly to the legs 251, pinching the distal ends of the angled leading surfaces 253 towards one another, causing the legs 251 to move towards one another to allow the peak 257 to clear the rod, before separating the removable slat 240 from the conveyor belt.

Conversely, to secure the removable slat 240 to the conveyor belt, the angled leading surfaces 253 of the legs 251 may be placed into a gap between two rods. A force may be applied towards the conveyor belt, which causes the legs 251 to deform inwardly, towards one another, due to the slope of the angled leading surfaces 253. Eventually, the legs 251 will deform sufficiently to allow the peak 257 to pass over the rod. Once the peak 257 is clear of the rod 216, the legs 251 will return to their original position, expanding away from one another, which allows the rod to seat within the notch 255. The same rod may also seat within a notch 255 of an adjacent slat 240. Alternatively, a force may be applied directly to the legs 251, proximate the distal ends of the angled leading surfaces 253, causing the legs 251 to move towards one another to allow the peak 257 to clear the rod, before moving the slat 240 towards the conveyor belt. Once the legs 251 are sufficiently deformed, the legs 251 may be moved into a gap between adjacent rods, and once the peak 257 is clear of the rod, the legs 251 may be allowed to expand away from one another into their original positions, which allows the rod to seat in the notch 255.

The slat 240 illustrated in FIGS. 10A-10D may be used as a master slat that is attached to the conveyor belt last and removed from the conveyor belt first when assembling or disassembling the conveyor belt assembly.

FIG. 11 illustrates a master link 300. The master link 300 may be used to close a loop of rods to form a closed loop conveyor belt. The master link 300 may be the last link attached to the conveyor belt and the first link removed from the conveyor belt when assembling or disassembling the conveyor belt assembly. The master link 300 includes a central rod 316, a first attachment device 345 at one end and a second attachment device 349 at another end. The first attachment device 345 and the second attachment device fit into the terminal hook connection element 118 of the conveyor belt (see FIG. 5A). The first and second attachment devices 345, 349 include a perpendicular cylinder 390 that is attached to a downward leg 392.

While the present invention has been described with respect to a particular embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

What is claimed is:

1. A conveyor belt assembly for moving a food product through a food preparation device, the conveyor belt assembly comprising:
    a conveyor belt, the conveyor belt comprising a plurality of spaced rods; and
    a plurality of slats, at least one of the slats in the plurality of slats including a flat body portion having a top surface and a bottom surface, the at least one slat being removably attached to the conveyor belt with a rod connection mechanism, the rod connection mechanism being located at a first end of the at least one slat, and the at least one slat being removably attached to an adjacent slat with a slat connection element, which is located at a second end of the at least one slat;
    wherein the rod connection mechanism comprises two hooks that extend away from the bottom surface of the flat body portion, the two hooks being offset from one another and separated from one another by a gap.

2. The conveyor belt assembly of claim 1, wherein the gap includes a radiused top.

3. The conveyor belt assembly of claim 1, wherein each of the hooks include a radiused cradle sized and shaped to receive a portion of a rod of the plurality of spaced rods.

4. The conveyor belt assembly of claim 3, wherein a tine of the hook connects the radiused cradle to an outer lateral surface.

5. The conveyor belt assembly of claim 4, wherein each of the hooks include a bottom surface that opposes the radiused cradle and is connected to the outer lateral surface and an inner lateral surface by a radiused edge.

6. The conveyor belt assembly of claim 5, wherein the radiused cradle includes a surface that forms an arc of a circle.

7. The conveyor belt assembly of claim 1, wherein the plurality of slats includes three or more side-by-side slats in a row of slats.

8. The conveyor belt assembly of claim 7, wherein the plurality of slats comprises three side-by-side slats that include:
    a first lateral outermost slat having a rod connection mechanism at one end and a slat connection mechanism at another end;
    at least one intermediate slat including slat connection elements at each end; and
    a second lateral outermost slat having a slat connection element at one end and a rod connection mechanism at another end.

9. The conveyor belt assembly of claim 1, wherein the at least one of the slats is a first lateral outermost slat and the adjacent slat is an intermediate slat including slat connection elements at each end, and further comprising:
    a second lateral outermost slat having a slat connection element at one end and a rod connection mechanism at another end;
    wherein the first lateral outermost slat and the second lateral outermost slat are connected to the intermediate slat by engagement of the respective slat connection elements to form a row of side-by-side slats.

10. A conveyor belt assembly for moving a food product through a food preparation device, the conveyor belt assembly comprising:
    a conveyor belt, the conveyor belt comprising a plurality of spaced rods; and
    a plurality of slats, at least one of the slats in the plurality of slats including a flat body portion having a top surface and a bottom surface, the at least one slat being removably attached to the conveyor belt with a rod connection mechanism, the rod connection mechanism being located at a first end of the at least one slat, and the at least one slat being removably attached to an adjacent slat with a slat connection element, which is located at a second end of the at least one slat;
    wherein the slat connection element includes a plate that extends downward, away from the flat body portion and substantially perpendicular to the flat body portion.

11. The conveyor belt assembly of claim 10, wherein the slat connection element includes a hook that extends forward from the plate.

12. The conveyor belt assembly of claim 11, wherein the hook includes a radiused surface that is sized and shaped to seat a portion of a rod of the plurality of spaced apart rods.

13. The conveyor belt assembly of claim 12, wherein the slat connection element includes a stabilizing wall that extends from the plate aft, towards a trailing edge of the flat body portion.

14. The conveyor belt assembly of claim 13, wherein the stabilizing wall is substantially perpendicular to the plate and extends towards the flat body portion.

15. The conveyor belt assembly of claim 10, wherein the plurality of slats includes three or more side-by-side slats in a row of slats.

16. The conveyor belt assembly of claim 15, wherein the plurality of slats comprises three side-by-side slats that include:
    a first lateral outermost slat having a rod connection mechanism at one end and a slat connection mechanism at another end;
    at least one intermediate slat including slat connection elements at each end; and
    a second lateral outermost slat having a slat connection element at one end and a rod connection mechanism at another end.

17. The conveyor belt assembly of claim 10, wherein the at least one of the slats is a first lateral outermost slat and the adjacent slat is an intermediate slat including slat connection elements at each end, and further comprising:
    a second lateral outermost slat having a slat connection element at one end and a rod connection mechanism at another end;
    wherein the first lateral outermost slat and the second lateral outermost slat are connected to the intermediate slat by engagement of the respective slat connection elements to form a row of side-by-side slats.

18. A food preparation device comprising:
    a housing;
    a heating element located within the housing; and
    a conveyor belt assembly, the conveyor belt assembly comprising:
        a conveyor belt, the conveyor belt including a plurality of spaced rods; and
        a plurality of slats, at least one of the slats in the plurality of slats including a flat body portion having a top surface and a bottom surface, the at least one slat being removably attached to the conveyor belt with a rod connection mechanism, the rod connection mechanism being located at a first end of the at least one slat, and the at least one slat being removably attached to an adjacent slat with a slat connection element, which is located at a second end of the at least one slat;

wherein the rod connection mechanism comprises two hooks that extend away from the bottom surface of the flat body portion, the two hooks being separated from one another by a gap.

19. The food preparation device of claim 18, wherein the gap includes a radiused top.

20. The food preparation device of claim 19, wherein each of the hooks include a radiused cradle.

21. The food preparation device of claim 20, wherein the radiused cradle is connected to a lateral surface with a tine.

22. The food preparation device of claim 21, wherein the radiused cradle includes a surface that forms an arc of a circle.

23. A food preparation device comprising:
a housing;
a heating element located within the housing; and
a conveyor belt assembly, the conveyor belt assembly comprising:
a conveyor belt, the conveyor belt including a plurality of spaced rods; and
a plurality of slats, at least one of the slats in the plurality of slats including a flat body portion having a top surface and a bottom surface, the at least one slat being removably attached to the conveyor belt with a rod connection mechanism, the rod connection mechanism being located at a first end of the at least one slat, and the at least one slat being removably attached to an adjacent slat with a slat connection element, which is located at a second end of the at least one slat;

wherein the slat connection element includes a plate that extends downward, away from the flat body portion and substantially perpendicular to the flat body portion.

24. The food preparation device of claim 23, wherein the slat connection element includes a hook that extends forward from the plate.

25. The food preparation device of claim 24, wherein the hook includes a radiused surface that is sized and shaped to seat a portion of a rod of the plurality of spaced apart rods.

26. A food preparation device comprising:
a housing;
a heating element located within the housing; and
a conveyor belt assembly, the conveyor belt assembly comprising:
a conveyor belt, the conveyor belt including a plurality of spaced rods; and
a plurality of slats, at least one of the slats in the plurality of slats including a flat body portion having a top surface and a bottom surface, the at least one slat being removably attached to the conveyor belt with a rod connection mechanism, the rod connection mechanism being located at a first end of the at least one slat, and the at least one slat being removably attached to an adjacent slat with a slat connection element, which is located at a second end of the at least one slat;

wherein the slat connection element includes a stabilizing wall that extends from a plate aft, towards a trailing edge of the flat body portion.

27. The food preparation device of claim 26, wherein the stabilizing wall is substantially perpendicular to the plate and that extends towards the flat body portion.

* * * * *